United States Patent

Wong et al.

[11] 4,287,255
[45] Sep. 1, 1981

[54] REINFORCED ADHESIVE TAPES

[75] Inventors: K. Lim Wong, Los Angeles; Gustav A. Schmidt, South Pasadena, both of Calif.

[73] Assignee: Avery International Corporation, San Marino, Calif.

[21] Appl. No.: 73,065

[22] Filed: Sep. 6, 1979

[51] Int. Cl.³ .............................. C09U 7/02; C09J 7/02
[52] U.S. Cl. .................................. 428/343; 427/207.1; 427/208.2; 427/208.4; 428/345; 428/913; 428/914
[58] Field of Search ............... 428/343, 345, 913, 914; 427/207.1, 208.4, 208.2; 430/260, 166

[56] References Cited

U.S. PATENT DOCUMENTS

| 2,086,126 | 7/1937 | Gilchrist | 427/207.1 |
| 2,755,196 | 7/1956 | Scholl | 428/343 X |
| 2,956,904 | 10/1960 | Hendricks | 428/345 |
| 3,094,432 | 6/1963 | Meyer-Jagenberg | 427/208.2 |
| 3,231,419 | 1/1966 | Korpman | 427/208.4 |
| 3,347,362 | 10/1967 | Rabuse et al. | 428/343 X |
| 3,649,283 | 3/1972 | Christensen et al. | 430/166 X |
| 3,959,528 | 5/1976 | Takeda et al. | 427/207.1 |

Primary Examiner—Thomas J. Herbert, Jr.
Attorney, Agent, or Firm—Christie, Parker & Hale

[57] ABSTRACT

A reinforced adhesive stock comprising a release liner on a carrier web and an adhesive layer in contact with the release liner. The adhesive layer comprises a mixture of an adhesive such as an anaerobic pressure-sensitive adhesive and a photopolymerizable compound. The photopolymerizable compound is capable of curing upon irradiating with actinic radiation. The adhesive layer contains strips of cured photopolymerizable compound which is cured by selectively irradiating with actinic radiation selective areas in strips within the adhesive layer. The resulting form strips of cured polymers provide a reinforcement to the adhesive layer inhibiting flow of the adhesive from the release liner. Additionally, the cured polymer strips provide added cohesive strength to the adhesive layer. A method of forming such adhesive stock is also disclosed.

9 Claims, 7 Drawing Figures

U.S. Patent     Sep. 1, 1981     4,287,255
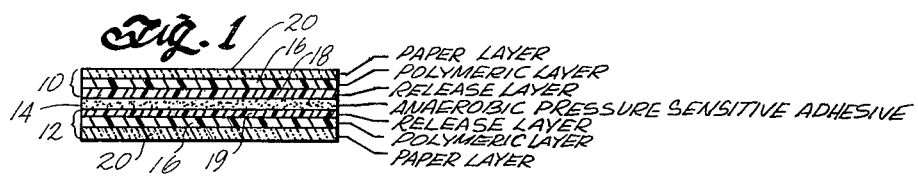
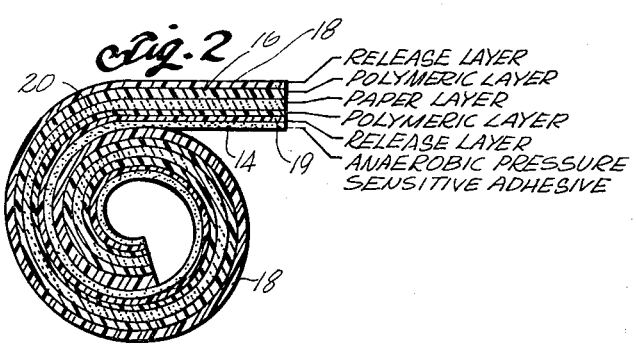
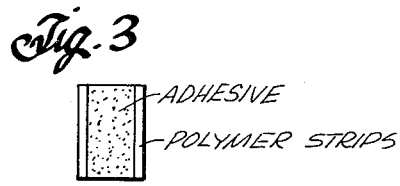
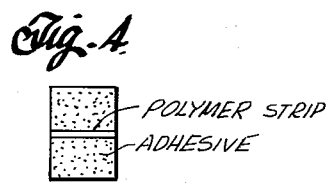
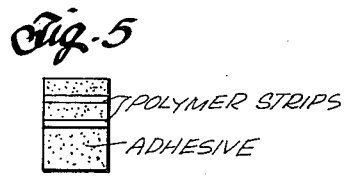
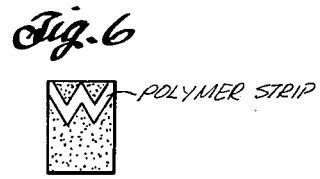
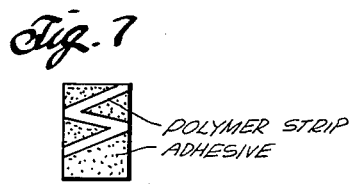

REINFORCED ADHESIVE TAPES

BACKGROUND OF THE INVENTION

Anaerobic adhesive systems are typically monomers which are stable in the presence of oxygen, but which polymerize in the absence of oxygen. Polymerization is initiated by the presence of a free radical generator such as a peroxy compound. The cured cross-linked resins are useful as sealants and as adhesives.

Typical resin monomers useful in anaerobic adhesive systems are terminated with polymerizable acrylate esters, such as methacrylate, ethacrylate and chloroacrylate esters. Another ingredient typically present is a polymerization initiator such as a free-radical mechanism initiator, preferably an organic hydroperoxide, such as cumene hydroperoxide, tertiary butyl hydroperoxide and the like. There is also normally provided a stabilizer against free radical initiation such as a quinone or hydroquinone, in an amount sufficient to prevent premature polymerization of the adhesive due to decomposition of the peroxy compound. There are also preferably present one or more accelerators which are typically organo-nitrogen-containing compounds such as tertiary amines, imides, sulfonamides and the like which promote the rate of cure. Cure can also be accelerated by the presence of a suitable metal, such as a transition metal, or its ion.

In application, an anaerobic adhesive is applied to one or both of the surfaces to be joined. When the two surfaces are joined and oxygen excluded, cure will be initiated. As is well known, surfaces such as glass may require application of a suitable accelerator such as a transition metal compound, which will increase the rate of cure on the substantial exclusion of oxygen or air. Anaerobic adhesives have been well published in the art as, for instance, in U.S. Pat. Nos. 2,895,950; 3,041,322; 3,043,820; 3,046,262; 3,203,941; 3,218,305; 3,300,547; 3,435,012; 3,547,851; 3,625,875; 3,993,815 and 4,039,705.

Anaerobic adhesive systems are typically supplied from a water-like liquid to a lightweight grease in consistency. One end use application is to apply the adhesives to the threads of a bolt or mating nut which are then assembled. The adhesive fills the spaces between the threads which excludes oxygen and enables cure in the normal situation. The metals present in the bolt or nut can accelerate curing.

As stated above, generally anaerobic adhesives are dispensed in a water-like liquid, a gel or grease form. It would be desirable to provide an anaerobic adhesive which can be dispensed as a tape. U.S. Pat. Nos. 3,993,815 and 4,039,705 describe anaerobic pressure-sensitive adhesive stocks which are in tape form. However, when such anaerobic adhesives are in such tape form, there is present some loss of the adhesive due to edge-ooze. Edge-ooze is the phenomena of the adhesive under pressure within a laminate structure being squeezed out of such structure due to its low viscosity. Additionally, conventional tape systems require a wide tape generally of at least ½ to ¾ inch wide to prevent or inhibit oxygen from being absorbed along the edges of the adhesive, which oxygen later will inhibit curing of the adhesive. The wider tapes provide retention of some adhesive properties as absorbed oxygen does not reach the inner portions of the adhesive layer. Anaerobic adhesive films which are now used contain reinforcing fiber to prevent the adhesive from flowing off its carrier film. Such fiber is positioned within the adhesive layer and acts as a barrier to the flow of the adhesive. Generally, a plurality of fibers positioned parallel with the edges of the carrier film are used.

An anaerobic adhesive is desirable which has sufficiently high adhesive properties but which can be applied in the manner of a film or tape for easy application to articles to be joined and which exhibits decreased edge-ooze characteristics which in film or tape form. Additionally, it would be desirable to have such anaerobic films in varying widths without worrying about increasing curing time.

SUMMARY OF THE INVENTION

According to the present invention, there are provided reinforced adhesive stocks and, in particular, a reinforced anaerobic pressure-sensitive adhesive stock such as sheets and tapes from which a pressure-sensitive adhesive layer, including an anaerobic resin system, can be completely transferred from one substrate to be bonded to another, and cured upon the exclusion of oxygen. The adhesive layer has sufficient cohesive integrity to provide ease of complete transfer and the substantial inhibition of loss of the adhesive while in tapes or sheets through edge-ooze. The cohesive integrity is provided by incorporating a photopolymerizable compound in the adhesive layer and selectively polymerizing the compound in geometric patterns.

A reinforced anaerobic pressure-sensitive adhesive stock comprises a release liner or liners which provide a differential release surface to permit separation of a reinforced pressure-sensitive adhesive layer containing an anaerobic resin system from one release surface prior to separation of the layer from the other release surface.

In the situation where a tape construction is employed, the web provided by the tape can provide the differential release surfaces. In a typical situation, the surface of lowest release value is on the upper surface of the web and the surface of greatest release value is on the under surface of the web, such that the reinforced pressure-sensitive adhesive is separated from the under surface of the web and retained upon the under surface of the web. The exposed adhesive surface can then be applied to the substrate (surface to be joined) while having one surface of the adhesive remaining in contact with the under surface of the web. After applying the reinforced pressure-sensitive adhesive to the substrate, the reinforced pressure-sensitive adhesive fully releases from the under surface of the web without cohesive failure of the adhesive layer.

In the instance of sheet construction, the lowest release surface is provided by at least one of the sheets or webs.

The presently preferred reinforced anaerobic pressure-sensitive adhesive compositions employed in the construction of tapes and sheets include an anaerobic resin system containing one or more resins dissolved in or otherwise combined with a thermoplastic polymer system of one or more high molecular weight polymers, the combination of which alone or upon inclusion of a tackifier, constitutes a pressure-sensitive adhesive system. To form the curable reinforced pressure-sensitive adhesive, there is also added a latent accelerator which is latent until made active by substantial exclusion of oxygen. Reinforcement of the anaerobic pressure-sensitive adhesive is provided by the addition of a photopolymerizable monomer or prepolymer to the anaerobic pressure-sensitive adhesive system. A catalyst for initiating the photopolymerizable reaction is also added.

Upon layering of the adhesive composition onto a release surface or a carrier film, the adhesive composition can be irradiated in selected areas and in selected geometric patterns to cure the provided photopolymerizable compound present in the adhesive composition. The selective irradiation of the adhesive composition cures the photopolymerizable compound without substantially affecting the other components, such as the anaerobic pressure-sensitive adhesive components. The anaerobic pressure-sensitive adhesive composition retains its gel or fluid-like consistency but the flow of the composition is restrained because of barriers formed by the polymerization of the photopolymerizable compound.

The photopolymerizable compound is added to the adhesive composition in an amount ranging from about 5 to about 20 percent by weight based on the total weight of the adhesive composition. The preferred amount of photopolymerizable compound depends upon the viscosity of the adhesive composition but is generally from about 5 to about 15 percent by weight. In addition, the photopolymerizable compound is selected such that upon selective polymerization within the adhesive composition, a curable anaerobic pressure-sensitive layer or film of sufficient cohesive strength to be applied to a substrate from differential release surfaces without disruption of the layer or film is formed.

Further, the reinforced anaerobic pressure-sensitive adhesive compositions should, when applied to a surface, wet the surface and conform to the intricacies of the surface such that a uniform bond is created upon cure, with cure extending throughout the layer of applied reinforced anaerobic pressure-sensitive adhesive composition to maximize cohesive bond strength.

Although the method herein is primarily designed for application to anaerobic adhesive systems because of inherent difficiencies in such systems, the method can also be practiced with regard to other adhesive systems such as pressure-sensitive adhesives.

BRIEF DESCRIPTION OF THE DRAWINGS

FIG. 1 illustrates one construction for a reinforced pressure-sensitive anaerobic adhesive stock in sheet form;

FIG. 2 illustrates a continuous self-wound tape construction for a reinforced pressure-sensitive adhesive stock;

FIG. 3 illustrates one embodiment of a geometric pattern formed within the adhesive composition by selectively polymerizing a photopolymerizable compound present in the adhesive composition;

FIG. 4 illustrates another embodiment of a geometric pattern formed upon polymerizing the photopolymerizable compound;

FIG. 5 illustrates an embodiment of a geometric pattern formed upon the polymerizing of the photopolymerizable compound;

FIG. 6 illustrates an embodiment of a geometric pattern formed by the selective polymerization of the photopolymerizable compound; and FIG. 7 illustrates an embodiment of a geometric pattern formed by the selective polymerization of the photopolymerizable compound.

DETAILED DESCRIPTION OF THE INVENTION

According to the present invention, there are provided reinforced anaerobic pressure-sensitive adhesive stocks, such as sheets and self-wound tapes from which a reinforced adhesive layer including an anaerobic resin system can be completely transferred to one substrate to be bonded to another and cured upon the exclusion of oxygen.

With reference to FIG. 1, the basic construction of sheets consists of a first web 10 providing a release layer 18 and a second web 12 providing a second release layer 19 between which there is contained a reinforced anaerobic pressure-sensitive adhesive layer 14. The webs provide differential release surfaces in the release layers 18 and 19 to permit preferential removal of one of the webs from the adhesive layer before removal of the other. FIG. 2 illustrates a typical construction for a continuous self-wound tape wherein the differential release layers 18 and 19 are contained on opposite sides of the web which comprises a paper layer between polymeric layers. The upper surface provided by release layer 18 has the highest release properties while the under surface provided by release layer 19 has the lowest release properties.

By the term "an anaerobic resin system" as used herein, there is meant one or more anaerobic resins having at least one, preferably two, polymerizable acrylate ester moieties, normally on the ends of the backbone, which polymerize or cure upon the substantial exclusion of oxygen or air, and preferably also in the presence of a suitable accelerator system. Exemplary anaerobic resin systems to which a photopolymerizable compound can be added and selectively cured for enhancing cohesive integrity of the anaerobic system, include the systems disclosed in U.S. Pat. No. 3,993,815, which is incorporated herein by this reference. Other adhesive systems which can be used include the novel adhesive systems disclosed in U.S. Pat. No. 3,890,407, which is incorporated herein by this reference.

Illustrative, but in no wise limiting, of the anaerobic resins which can be used in the preparation of pressure-sensitive adhesive compositions of the invention, are polymerizable acrylate esters. As used herein, "acrylate esters" include the $\alpha$-substituted acrylate esters, such as the methacrylate, ethacrylate and chloroacrylate esters.

Of particular utility as adhesive monomers are polymerizable di- and other polyacrylate esters since, because of their ability to form cross-linked polymers, they have highly desirable adhesive properties. However, monoacrylate esters can be used, particularly if the monoacrylate portion of the ester contains a hydroxyl or amino group, or other reactive substituent which serves as a site for potential cross-linking. Examples of monomers of this type are hydroxyl ethyl methacrylate, cyanoethyl acrylate, t-butylaminoethyl methacrylate and glycidyl methacrylate.

One of the most preferable groups of polyacrylate esters which can be used in the adhesives disclosed herein are polyacrylate esters which have the following general formula:

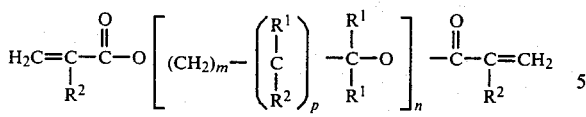

wherein
R[1] represents a radical selected from the group consisting of hydrogen, lower alkyl of from 1 to about 4 carbon atoms, hydroxyl alkyl of from 1 to about 4 carbon atoms and the radical:

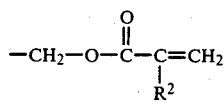

R[2] is a radical selected from the group consisting of hydrogen, halogen, and lower alkyl of from 1 to about 4 carbon atoms;

R[3] is a radical selected from the group consisting of hydrogen, hydroxyl; and

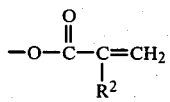

m is an integer equal to at least one, example, given, e.g., from 1 to about 15 or higher, and preferably from 1 to about 8 inclusive;

n is an integer equal to at least one, example given, e.g., 1 to about 20 or more; and p is either zero or one.

The polymerizable polyacrylate esters utilized in accordance with the invention and corresponding to the above general formula are exemplified by, but not restricted to, the following materials; di-, tri-, and tetraethylene glycol dimethacrylate, dipropylene glycol dimethacrylate, polyethylene glycol dimethacrylate, di(pentamethylene glycol)dimethacrylate, tetraethylene glycol diacrylate, tetraethylene glycol di(chloroacrylate), diglycerol diacrylate, diglycerol tetramethacrylate, tetramethylene dimethacrylate, ethylene dimethacrylate, neopentyl glycol diacrylate and trimethylolpropane triacrylate.

Yet another class of acrylate esters are those which are formed by the reaction of:

a. an acrylate ester containing an active hydrogen atom in the alcoholic moiety of the ester; with b. an organic polyisocyanate.

Compositions including this general type of ester are disclosed in U.S. Pat. No. 3,425,988. Preferably the active hydrogen is a hydrogen of a hydroxyl or a primary or secondary amine substituent on the alcoholic moiety of the ester, and the polyisocyanate is a diisocyanate. Naturally, an excess of the acrylate ester should be used to insure that each isocyanate functional group in the polyisocyanate is substituted.

The most preferred of the acrylate esters used in the manner described in the preceding paragraph are those in which the acrylate ester is a substituted alkyl or aryl acrylate ester, most preferably having the formula:

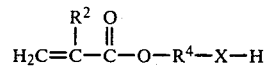

wherein X is

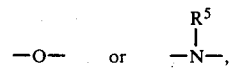

wherein
R[5] is a hydrogen atom or a monovalent hydrocarbon radical containing up to about 10 carbon atoms, and is preferably a hydrogen atom for an alkyl or aralkyl radical with from 1 to 10 carbon atoms;

R[2] is as defined above; and

R[4] is an alkylene radical with from 1 to 10 carbon atoms or a divalent aromatic radical containing up to 14 carbon atoms, preferably phenylene, biphenylene or naphthylene.

Naturally R[5] and R[4] can contain any substituents or linkages which do not adversely affect the molecule for its intended use herein.

Typical polyisocyanates, which can be reacted with the above acrylate esters to form polyacrylate monomers, are toluene diisocyanate, 4,4'-diphenyl diisocyanate, dianisidine diisocyanate, cyclohexylene diisocyanate, 2-chloropropane diisocyanate, 4,4'-diphenylmethane diisocyanate, 2,2'-diethyl ether diisocyanate, 3-(dimethylamino)-pentane diisocyanate, tetrachlorophenylene diisocyanate-1,4 and trans-vinylene diisocyanate. Still other polyisocyanates that can be used are higher molecular weight polyisocyanates obtained by reacting an excess of any of the above described isocyanates with polyamines containing terminal, primary and secondary amine groups or polyhedric alcohols, for example, the alkane and alkene polyols, such as glycerol, 1,2,6-hexane triol, 1,5-pentanediol, ethylene glycol, polyethylene glycol, 4,4'-dihydroxydiphenyldimethylmethane and condensation products of alkylene oxides with 4,4'-dihydroxydiphenyldimethylmethane.

Other acceptable monomers which can be used in the compositions according to the invention are acrylate terminated epoxy or ester units, i.e., reaction products of acrylic acid with hydroxy terminated ester or epoxy compounds, or low molecular weight polymers thereof. Also, contemplated by this invention are any other anaerobically curing monomers which, with their respective initiators, accelerators and stabilizers, i.e., inhibitors, are formulated according to the instant invention into pressure-sensitive anaerobic adhesives producing the advantageous properties of the stocks of the instant invention.

Naturally, any of the above-described acrylate and polyacrylate ester monomers can be used in combination, if desired.

The presently preferred anaerobic monomers are triethylene glycol dimethacrylate; the reaction product of hydroxypropyl methacrylate with methylene-bisphenyl-4,4'-diisocyanate; a polymer formed by methacrylate capping of a 1:1 adduct of toluene diisocyanate and hydrogenated 2,2-bis(4-hydroxy phenyl)propane, as well as mixtures thereof.

There can also be present reactive polymers such as acrylic acid, methacrylic acid and the like which crosslink with anaerobic monomers.

By the term "photopolymerizable compound" as used herein, there is meant a monomer or prepolymer or mixtures thereof which are capable of polymerizing by irradiation with actinic radiation for forming a polymer having a sufficiently high molecular weight that it becomes highly viscous and resists flowing. The formed polymer can also be a hardened polymeric material upon curing with actinic radiation. The term "photopolymerizable" is used in a generic sense herein to mean capable of polymerization upon irradiation with actinic radiation whether the radiation is photon radiation or other radiation, such as electron beam, X-ray radiation, or gamma ray radiation. Thus, the term encompasses radiation which is capable of initiating and generating free radical reaction, such as infrared, visible, ultraviolet (UV) X-ray and electron beam radiation.

The photopolymerizable compounds, when cured to form a polymeric pattern within the anaerobic pressure-sensitive adhesive, provide sufficient resistance to the flow of such adhesive that the adhesive can be transferred from a release surface to a substrate which is to be bonded to another substrate. Although it is desirable that the photopolymerizable compounds employed be compatible with the anaerobic system, they can be incompatible, forming an heterogenous system prior to radiation curing.

The word "combined" is used herein to indicate any workable combination, regardless of its physical form, of one or more photopolymerizable compounds with one or more anaerobic monomers. Thus, a given combination can be a solution or otherwise and can be homogeneous or heterogenous, provided only that it is useful in the pressure-sensitive anaerobic stock of the invention.

Typical of the photopolymerizable compounds which can be used are polyesters, phenol-formaldehyde polymers, ureaformaldehyde polymers, hydroxyl terminated polyethers, hydroxyl terminated polyesters, unsaturated polyesters, acrylated urethanes, acrylated polysiloxanes, acrylated fluoro polymers, acrylated epoxys, epoxy polyesters, epoxy polyethers and mixtures thereof.

To initiate the photopolymerization of the photopolymerizable compounds upon exposure to actinic radiation such as UV light, a UV initiator is employed. Many UV initiators are known in the art and can be employed in the practice hereof. For example, a preferred UV initiator is isobutyl benzoin ether.

As accelerators, there can be mentioned liquid and solid organo-nitrogen compounds including but not limited to organic amides, such as formamide, succinimide and the like; tertiary amines such as tributylamine, triethylamine, hexylmethyl pararosanilane and the like; aromatic tertiary amines such as dimethylparatoluidene and the like; Schiff bases such as the condensation products of an aldehyde and amine, e.g., butyraldehyde and aniline, benzaldehyde and aniline, butyraldehyde and butylamine; organic sulfamides such as benzoylsulfamide and the like; as well as mixtures thereof. Organo-nitrogen compounds which have a lower vapor pressure at ambient temperatures are particularly preferred as they have the least effect on the viscosity of the resulting composition, as well as the least tendency to migrate from the composition.

Depending on the amount of anaerobic resin system contained in the entire polymer system, the amount of accelerator ranges from about 0.5 to about 20 percent or more by weight based on the total weight of the polymer system plus anaerobic resin system, and if present, a tackifier.

By the term "anaerobic pressure-sensitive adhesive" there is meant a mixture of the anaerobic resin system and the photopolymerizable system and, if desired, a tackifier, which in an essentially solvent free state is permanently tacky at room temperature, and which firmly adheres to a variety of ordinary surfaces upon contact without the need of more than finger pressure. Further, it must conform to the surface irregularities of normal surfaces and have a sufficient shear modulus to resist removal subsequent to application to a surface.

To meet these criteria, the net, essentially solvent free, reinforced anaerobic pressure-sensitive adhesive film or layer must have static shear strength of at least two minutes using a 250 gram test weight and a 0.25 square inch test surface and a 180° peel strength of at least 0.5 pounds per inch, preferably 1.0 pounds per inch, when measured by standard tests specified hereinafter and separates from a conventional release surface such as a silicone coating and the like without cohesive failure.

Another useful property is tack. Tack is, in general, a measure of the ability of the adhesive to separate from one release surface and adhere sufficiently to a substrate to enable separating the cast adhesive from another release surface without cohesive failure. In this test, which is dynamic, degree of grab for a substrate and temporary adhesive deformity are inversely proportional to the travel, as measured in inches, of a standard test ball down an incline plane coated with the adhesive. Tack values of less than about 10 inches, preferably less than about 5 inches, are preferred.

As indicated, a tackifier can be employed to induce or enhance pressure-sensitive properties. Typical tackifiers are rosins, rosin derivatives, terpenes, synthetic tackifying resins, low molecular weight polyacrylates and the like, as well as mixtures thereof. The tackifiers employed in general have a molecular weight less than about 5,000, and preferably below about 1,000.

Generally, anaerobic resins containing a cure system are normally liquid to grease-like in consistency and packaged in containers of a type where provided oxygen precludes premature gelation or cure.

With reference now to FIG. 2, there is shown a configuration for a self-wound tape construction. All of the parameters set for the construction described above apply.

Where a paper web 20 is used it can, depending on packaging and service conditions, preferentially be dual coated with polymeric materials 16 upon which there is provided the differential release surfaces 18 and 19. In the alternative, there can be simply provided a single polymeric film 16 having applied differential release surfaces 18 and 19.

In either event, it is preferred that the bond of the pressure-sensitive layer including anaerobic resin system, have the lowest bond to release layer 18 as compared to release layer 19 to provide the most convenient transfer characteristics. As indicated, with reference to FIGS. 1 and 2, the differential release surfaces 18 or 18 and 19 necessary for adhesive transfer can be provided by varying the nature of the release surface, typically a silicone release coating, or by varying their method of fabrication.

While nowise limiting wherein common release materials are employed, the adhesive compositions independent of their ultimate configuration are typically applied from solvent systems or by other suitable film casting techniques. While applying the adhesive to one release surface, a greater bond is created between the adhesive layer and the release surface due to interaction while the second release surface has a relatively weak physical bond to the provided pressure-sensitive adhesive layer.

Pressure-sensitive adhesive layers provided in accordance with the present invention can be applied by a variety of known means. In either event, the total layer is applied through a solvent system, whereas the second release coated layer is typically applied subsequent to solvent evaporation.

Another method of providing the differential release surfaces is to have the surface which is to be of lowest release value, a paper coated with a mat finished polymeric layer, such as polyethylene, to which the release coating is applied followed by application of the adhesive layer. Because of interaction during solvent evaporation, the applied film becomes more strongly adherent to the release surface associated with the mat-finished polymer. The opposed release coating is applied to a smooth finished polyethylene or other polymeric coating. The bond only being physical, provides the required differential release surfaces.

Independent of the construction employed, care must be taken in preparing the tape and sheet construction to prevent premature cure or loss of activity during shelf life.

The reinforced anaerobic pressure-sensitive adhesive compositions employed in the fabrication of sheets and tapes, in accordance with this invention, normally contain substantial quantities of anaerobic resins in order that the photopolymerizable compound employed does not interfere to any great degree with thorough and complete cross-linking or curing of the anaerobic resin system and to provide desired bond upon cure. The anaerobic pressure-sensitive adhesive compositions can contain, based upon a total weight of an anaerobic resin system and the photopolymerizable compound and, if present, tackifiers, from about 4 to about 90 percent by weight total anaerobic resins, preferably from about 35 to about 65 percent by weight. In small quantities, the anaerobic resin, upon cure, immobilizes the balance of the composition to prevent "creep" or "sag" although lap shear can be relatively low, e.g., 100 psi. At higher concentrations, high lap shear bonds in excess of 1,000 psi can be easily realized.

Coating weight of the cast pressure-sensitive areas can be varied over a wide range with the general object of achieving surface wetting for a strong and tenacious bond. Typical coating weights are, after solvent evaporation, from about 20 to about 80 grams of net solids per square meter.

What is required is that the applied reinforced anaerobic pressure-sensitive adhesive layer be removable from the release liner of maximum interfacial bond, typically a silicone coated liner, for transfer to a substrate without cohesive disruption of the reinforced anaerobic pressure-sensitive adhesive layer. It is desirable for any given application to have the coating as thin as is conveniently possible. Cross-linking rapidly occurs throughout the reinforced anaerobic pressure-sensitive adhesive and the surfaces are bonded together. If the coating is too thick, longer cure times can be required or there can be formed an internal weakness which could result in cohesive failure of the partically cured resin.

Upon combining the photopolymerizable compound with the anaerobic adhesive system, the photopolymerizable compound intermixes with the adhesive system in either a homogeneous or heterogeneous manner. The intermixed photopolymerizable compound provides irradiation-curable property to the adhesive layer.

The anaerobic adhesive and photopolymerizable compound can be dispensed or cast onto a suitable release layer coated onto a suitable carrier film, such as a release layer coated onto a polymeric-coated paper. The adhesive and photopolymerizable compound can be cast as a mixture or each separately with mixing occurring following casting.

After casting the adhesive and photpolymerizable compound, the resultant mixture can be treated for removing any solvents which may have been used in casting the adhesive and/or photopolymerizable compound. Following solvent removal, the adhesive layer can be selectively irradiated with actinic radiation to selectively cure the photopolymerizable compound present in defined areas of the adhesive layer. The geometric pattern in which the photopolymerizable compound is cured can be any geometric pattern which lends cohesive strength and integrity to the adhesive layer and which imparts a resistance to or inhibits oozing or running of the adhesive, whether under pressure or not from the release surface on which it has been cast. With reference to FIGS. 3-7, various possible geometric configurations which can be provided within an adhesive layer are illustrated.

FIG. 3 illustrates a strip of adhesive tape, such as the tape shown in FIG. 2, wherein a strip along each edge of the tape is irradiated. Upon irradiation with actinic radiation the photopolymerizable compound within the irradiated strips cures to a hardened or highly viscous polymer. The formed polymer then acts as a barrier for preventing the adhesive between the strips from running or oozing from the carrier film.

FIGS. 4 and 5 illustrate an irradiated strip or strips which extend across the tape. Such a strip of hardened or highly viscous polymer provides a cohesive integrity to the adhesive layer and assists in the transfer of the adhesive layer from the release layer to a substrate to be bonded. Such a strip or strips of polymer inhibit the flow of adhesive along the length of the tape or carrier film. The cured, polymeric strips extending across the adhesive layer increase the static shear of the adhesive layer.

FIGS. 6 and 7 also illustrate two geometric patterns in which the adhesive layer containing the photopolymerizable compound can be irradiated. FIG. 6 illustrates a "W" shape and FIG. 7 illustrates a generally "Z" shape. Both of these patterns also increase the static shear of the adhesive layer and inhibit the flow of the adhesive. Other configurations of irradiation are also possible and beneficial in inhibiting flow of the adhesive layer. For example, diagonal cured strips and crossing diagonal cured strips can be employed.

The width of the cured polymeric strip can vary depending upon the width of the anaerobic adhesive tape formed. However, it is preferred to irradiate and form a strip about 1 millimeter in width. Such a width is sufficiently wide to inhibit flow of the adhesive and yet is sufficiently narrow as not to substantially decrease the effective contact surface area of the adhesive layer.

Curing of the photopolymerizable compound is accomplished by irradiating the adhesive layer containing the photopolymerizable compound in narrow strips.

Such irradiating can be performed by masking the adhesive layer with a mask containing the desired geometric pattern and irradiating with actinic radiation to cure the exposed areas. Irradiating can also be performed using an irradiation source having an attenuable beam of radiation and by attenuating the beam to irradiate a narrow area or pattern on the adhesive layer. For example, a narrow electron beam can be used to irradiate a photopolymerizable compound within the adhesive. Exemplary as a light source for an irradiation device having a narrow or attenuable light beam is a laser which can be used to irradiate the layer without the need for using a mask.

In substance, the total reinforced anaerobic pressure-sensitive system acts as a binding agent for the anaerobic monomers until cure is complete and then the residual constituents only serve as fillers for the system.

The types of products typically formed are the self-wound tapes, the surface of the supporting tape having differential release properties, sandwich constructions in which the reinforced anaerobic pressure-sensitive adhesive composition is contained between two carrier liners having differential release surfaces, and similar products. All that is necessary is that the reinforced anaerobic pressure-sensitive layer be transferable to a substrate and completely separated from its carriers to leave only an anaerobic pressure-sensitive adhesive in contact with the substrate to be bonded to another substrate.

The following illustrative anaerobic resin systems can be employed for the formulation of anaerobic pressure-sensitive adhesive compositions for use in the present invention. In the following Examples the anaerobic resin system designated as Resin II was utilized; however, both can have utility as well as other anaerobic systems.

Resin I

Approximately 75 percent of a reaction product of two moles of hydroxypropyl methacrylate with one mole of methylene-bis-phenyl-4,4'-diisocyanate and 25 percent triethylene glycol dimethacrylate.

Resin II

A polymer formed by hydroxypropyl methacrylate capping of a 1:1 adduct of toluene diisocyanate and hydrogenated 2,2-bis(4-hydroxyphenyl) propane.

The following test methods were employed in evaluating the pressure-sensitive properties and adhesive properties of the cured end products. In determining pressure-sensitive adhesive load bearing properties, the adhesive composition was cast on a suitable support such as paper or Mylar.

Static shear strength federal test method standard No. 147B, method 20.1 (load 250 grams).
180° peel (dynamic-12 inches/minute)-ASTM D-100/68.
Polyken tack test-ASTM D 2979-71.
Loop tack, Tape and Label Manufacturers Institute, modified by using 8 inches by 1 inch sample.

The drop test consists of dropping from a six foot height a sample comprising two steel panels 3½×1×1/16 inches, pinned, bonded and cured over one-half inch area with the adhesive formulations. If the panels remain bonded together after multiple drops during the test wherein different modes of impact are tested, then the adhesive is categorized as having passed the test. If fracture of the adhesive occurred, then it is categorized as failed.

The bend test is conducted utilizing steel panel samples as described in regard to the drop test. The steel panels, bonded together with the adhesive, are bent slowly until the originally flat sample becomes shaped with an enclosed angle greater than 90° but less than 180°. If the adhesive bond does not fracture, the sample is considered to have passed the test.

EXAMPLE I

An adhesive composition containing an anaerobic resin system, a pressure-sensitive system and a photopolymerizable system was prepared in the following manner. The adhesive composition had the following components in percentage by weight.

| Ingredient | Percent by weight |
|---|---|
| Chlorosulfanated polyethylene containing 30 weight percent chlorine | 19.5 |
| Acrylate polyvinyl pyrrolidone | 44.2 |
| N-isobutoxy methyl acrylamide | 14.1 |
| Resin II | 14.1 |
| Photopolymerizable compound, Uvithane 788 (a urethane based oligomer which is a product of Thiokol Chemical Corp.) | 7.1 |
| Saccharin | 1.0 |
| Isobutyl Benzoin Ether (UV initiator, commercially available as Trigonal 14, a product of Noury Chemical Co.) | 0.4 |

The ingredients were dissolved in a toluene-hexene blend as a solvent to a 55 percent by weight solids content and coated to a thickness of 6 mils on a first release liner providing a first release surface.

After solvent evaporation, there was applied a second release liner having a release surface of lower adhesion to the formed adhesive layer. The curable reactive adhesive had a thickness of approximately 3 mils.

The film is successfully cured anaerobically in the presence of a Schiff base accelerator which was the condensation product to butyraldehyde and anailine. Selective curing of areas of the adhesive layer is accomplished by irradiating the adhesive layer with a PPG UV Processor 2C 1201 H/A in two passes at 200 watts/in at a speed of 100 ft/min.

Upon cure of the anaerobic system, the following tests were conducted with the following results.

Drop Test: Passed
Bend Test: Passed
Fixture Time: 15 minutes
24 hour cure lap shear: 1100 psi

EXAMPLE II

An adhesive system was prepared having the following composition.

| Ingredient | Percent by weight |
|---|---|
| Chlorosulfanated polyethylene containing 30 weight percent chlorine | 19.5 |
| Acrylate polyvinyl pyrrolidone | 44.2 |
| N-isobutoxy methyl acrylamide | 14.1 |
| Photopolymerizable compound (XD-9002, a product of Dow Chemical Co.) | 21.2 |
| Saccharin | 1.0 |
| Isobutyl Benzoin Ether | 0.4 |

The ingredients were dissolved in a toluene hexane blend as a solvent to a 55 percent by weight solids content and coated to a thickness of 6 mils on a first release liner having a first release surface.

After solvent evaporation, there was applied a second release liner having a release surface of lower adhesion to the formed adhesive layer. The reactive adhesive had a thickness of approximately 3 mils.

The adhesive film was successfully cured anaerobically using as an accelerator the condensation product of butyraldehyde and aniline (Schiff base). The adhesive is irradiated with a PPG UV processor 2C 1201 H/A in two passes at 400 watts/in at a speed of 100 ft/min.

The cured adhesive had the following properties:
Drop Test: Passed
Bend Test: Passed
Fixture Time: 30 minutes
24 hour cure lap shear: 1000 psi

EXAMPLE III

The adhesive composition prepared in Example I was dissolved in a toluene hexane blend as the solvent to a 55 percent by weight solids content and coated to a thickness of 6 mils on a first release liner having a first release surface.

After solvent evaporation, the formed adhesive was partially irradiated with ultraviolet light using an ultraviolet processor (PPG UV Processor QC 1202 N/A of PPG Industries). The adhesive was irradiated twice, once at about 200 watts/in. and the second time at about 400 watts/in. at a speed of 100 feet per minute.

Successive adhesive tapes were irradiated in the geometric patterns illustrated in the drawings as FIGS. 3–7. After irradiation, the adhesive was protected with a second release liner having release surface of lower adhesion than the first release surface. The irradiated reinforced adhesive had a thickness of approximately 3 mils and showed improved handling properties, as well as static shear over the unirradiated film.

The following results were obtained:

| | Sample | Static Shear |
|---|---|---|
| a | Unirradiated | 1.2 minutes |
| b | A geometric figure as illustrated in FIG. 3 was formed by irradiating a 1 ml. strip on each edge of the test sample. | 20 minutes |
| c | A geometric pattern as illustrated in FIG. 4 was formed by irradiating the adhesive strip. | 5 minutes |
| d | A geometric pattern as illustrated in FIG. 5 was formed by irradiating the adhesive strip. | 6 minutes |
| e | A geometric figure as illustrated in FIG. 6 was formed by irradiating the adhesive strip. | 18 minutes |
| f | A geometric figure as illustrated in FIG. 7 was formed by irradiating the test sample. | 5 minutes |

What is claimed is:

1. A reinforced adhesive stock comprising:
   (a) a carrier web;
   (b) a release surface on the carrier web;
   (c) an adhesive layer comprising an adhesive and a photopolymerizable compound on the release surface; and
   (d) at least one radiation-cured polymeric strip of the photopolymerizable compound within the adhesive layer.

2. A reinforced adhesive stock as recited in claim 1 wherein at least one radiation-cured polymeric strip extends across the adhesive layer intersecting two edges of the adhesive layer.

3. A reinforced adhesive stock as recited in claim 1 wherein a radiation-cured polymeric strip extends longitudinally along each edge of the adhesive layer.

4. A reinforced adhesive stock as recited in claim 1 wherein the adhesive comprises a transferable and curable anaerobic adhesive.

5. A reinforced adhesive stock as recited in claim 1 wherein the adhesive comprises a pressure-sensitive adhesive.

6. A reinforced adhesive stock comprising:
   (a) a carrier web;
   (b) a release surface on the carrier web;
   (c) a transferable adhesive layer on the release surface comprising in admixture a polymerizable acrylate ester capable of polymerizing upon exclusion of air and a photopolymerizable compound capable of polymerizing upon exposure to actinic radiation; and
   (d) at least one radiation-cured polymeric strip of such photopolymerizable compound within the adhesive layer.

7. A reinforced adhesive stock as recited in claim 6 wherein the polymerizable acrylate ester comprises a monomer selected from the group consisting of triethylene glycol dimethacrylate, the reaction product of hydroxypropyl methacrylate with methylene-bisphenyl-4,4'-diisocyanate, a polymer formed by methacrylate capping of a 1:1 adduct of toluene diisocyanate and hydrogenated 2,2-bis(4-hydroxyphenyl)-propane, and mixture thereof.

8. A reinforced adhesive stock as recited in claim 6 wherein the photopolymerizable compound comprises from about 5 to about 20 percent by weight of the adhesive layer.

9. A reinforced adhesive stock as recited in claim 1 or 6 wherein such radiation-cured polymeric strip is about 1 millimeter in width.

* * * * *

UNITED STATES PATENT AND TRADEMARK OFFICE
CERTIFICATE OF CORRECTION

PATENT NO. : 4,287,255
DATED : September 1, 1981
INVENTOR(S) : K. Lim Wong et al.

It is certified that error appears in the above-identified patent and that said Letters Patent is hereby corrected as shown below:

Column 2, line 8, "which" should read -- while --.

Column 5, line 31, "example, given," should read -- example given,--. Column 10, line 14, "photpolymerizable" should read -- photopolymerizable --. Column 12, line 42, "anailine" should read -- aniline --. Column 12, line 42, "to" should read -- of --.

Signed and Sealed this

*First* Day of *February 1983*

[SEAL]

*Attest:*

GERALD J. MOSSINGHOFF

*Attesting Officer* — *Commissioner of Patents and Trademarks*